United States Patent
Vogel et al.

(10) Patent No.: US 8,616,704 B2
(45) Date of Patent: Dec. 31, 2013

(54) AREA PROJECTION SYSTEM FOR REPRODUCING A VISUAL SIGNAL ON A SURFACE

(75) Inventors: Carsten Vogel, Hamburg (DE); Detlef Heym, Achim (DE)

(73) Assignee: Airbus Operations GmbH (DE)

( * ) Notice: Subject to any disclaimer, the term of this patent is extended or adjusted under 35 U.S.C. 154(b) by 358 days.

(21) Appl. No.: 13/057,592

(22) PCT Filed: Aug. 5, 2009

(86) PCT No.: PCT/EP2009/060166
§ 371 (c)(1),
(2), (4) Date: Feb. 4, 2011

(87) PCT Pub. No.: WO2010/015661
PCT Pub. Date: Feb. 11, 2010

(65) Prior Publication Data
US 2011/0157557 A1    Jun. 30, 2011

Related U.S. Application Data

(60) Provisional application No. 61/188,048, filed on Aug. 6, 2008.

(30) Foreign Application Priority Data

Aug. 6, 2008 (DE) .......................... 10 2008 036 616

(51) Int. Cl.
G03B 21/14    (2006.01)
(52) U.S. Cl.
USPC .............................. 353/13; 353/69; 353/122

(58) Field of Classification Search
USPC ................. 353/13, 30, 122, 69; 3/13, 30, 122
See application file for complete search history.

(56) References Cited

U.S. PATENT DOCUMENTS

| | | |
|---|---|---|
| 4,776,666 A | 10/1988 | Kuehn et al. |
| 6,203,180 B1 | 3/2001 | Fleischmann |
| 6,224,216 B1 | 5/2001 | Parker et al. |
| 6,337,724 B1 * | 1/2002 | Itoh et al. ...................... 349/75 |
| 7,088,321 B1 * | 8/2006 | Parker ............................ 345/83 |
| 2007/0252954 A1 * | 11/2007 | McGuire et al. ............... 353/20 |

FOREIGN PATENT DOCUMENTS

| | | |
|---|---|---|
| DE | 10208111 A1 | 9/2003 |
| DE | 102004031700 A1 | 1/2006 |
| DE | 102004051062 A1 | 5/2006 |
| DE | 102005016116 A1 | 10/2006 |
| EP | 1102231 A1 | 5/2001 |
| WO | 2008/049432 A1 | 5/2008 |

* cited by examiner

Primary Examiner — Tony Ko
(74) Attorney, Agent, or Firm — Lerner, David, Littenberg, Krumholz & Mentlik, LLP

(57) ABSTRACT

An area projection system for reproducing a visual signal on a surface, comprising a light source, a fiber element comprising a plurality of light guide elements, a carrier element and imaging optics, wherein the fiber element comprises a first end and a second end, wherein the first end of the fiber element is arranged on the light source and the second end of the fiber element is arranged on the carrier element, wherein the imaging optics are arranged on the second end of the fiber element, wherein the area projection system is adapted to transmit a visual signal from the light source to the fiber element and subsequently to the imaging optics, and wherein the imaging optics are adapted to reproduce the visual signal on a surface.

12 Claims, 10 Drawing Sheets

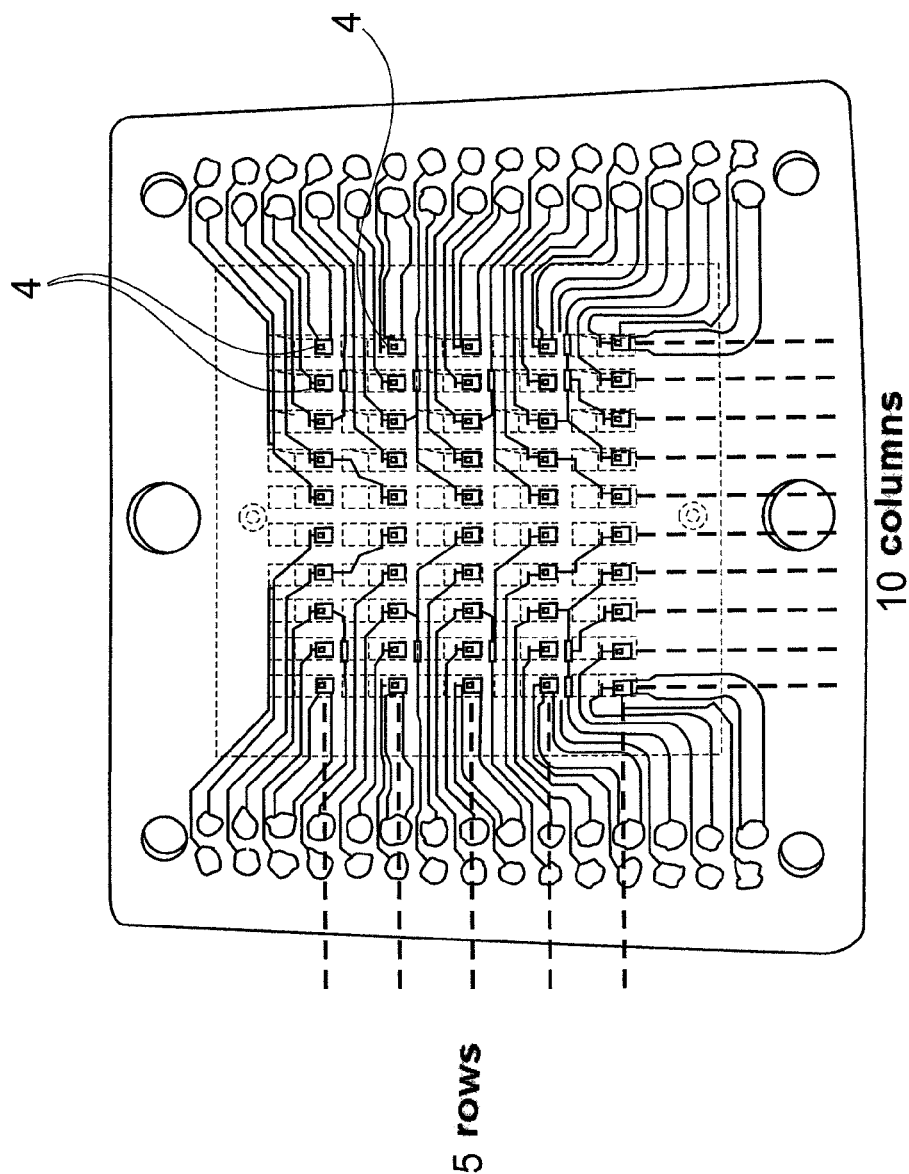

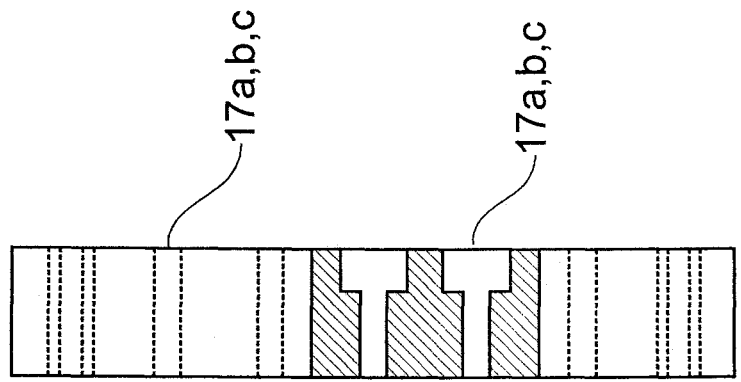
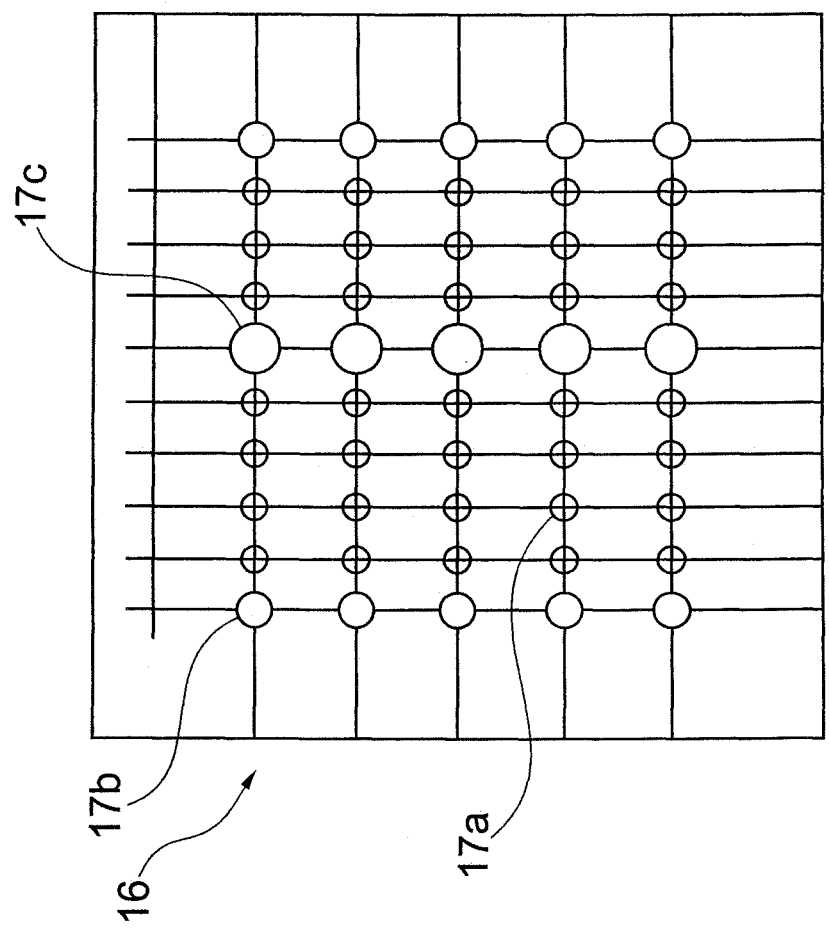
Fig. 9b
Fig. 9a

AREA PROJECTION SYSTEM FOR REPRODUCING A VISUAL SIGNAL ON A SURFACE

CROSS-REFERENCE TO RELATED APPLICATIONS

This application is a national phase entry under 35 U.S.C. §371 of International Application No. PCT/EP2009/060166, filed Aug. 5, 2009, published in English, which claims the benefit of the filing date of German Patent Application No. 10 2008 036 616.1 filed Aug. 6, 2008 and the filing date of U.S. Provisional Patent Application No. 61/188,048 filed Aug. 6, 2008, the entire disclosures of which are hereby incorporated herein by reference.

TECHNICAL FIELD OF THE INVENTION

The invention relates to an area projection system for reproducing a visual signal on a surface; to an aircraft comprising an area projection system for reproducing a visual signal on a surface; and to the use of an area projection system for reproducing a visual signal on a surface in an aircraft.

BACKGROUND OF THE INVENTION

The German patent application DE 10 2004 031 700 describes an information display system for an aircraft for displaying information, comprising a light source, a projection means and a housing. In this arrangement the projection means may be arranged in the form of a liquid crystal display so that, in combination with a high-power light emitting diode and suitable optics, information may be displayed on a projection area.

Conventional area projection systems make it possible to reproduce a visual signal on a surface. However, at times the visual signal may be perceived only with difficulty, for example because, due to ambient light conditions, the brightness of the area projection system may be insufficient for comfortably perceiving the imaged visual signal, or because the imaging sharpness of the visual signal may not be adequate for comfortably perceiving the visual signal.

SUMMARY OF THE INVENTION

It is an object of the present invention to provide a user-friendly area projection system that comprises improved imaging sharpness and improved brightness for reproducing a visual signal, for example the depiction of a starry sky, on a surface.

This object is met by an area projection system for reproducing a visual signal on a surface; by an aircraft comprising an area projection system; and by the use of an area projection system for reproducing a visual signal on a surface in an aircraft according to the independent patent claims.

According to an exemplary embodiment of the present invention, an area projection system for reproducing a visual signal on a surface is provided, comprising a light source, a fibre element, with the fibre element comprising a plurality of light guide elements, a carrier element and imaging optics. The fibre element comprises a first end and a second end, wherein the first end of the fibre element is arranged at the light source, and the second end of the fibre element is arranged at the carrier element. The imaging optics are arranged at the second end of the fibre element. The area projection system is adapted to transmit a visual signal from the light source to the fibre element and subsequently to the imaging optics, wherein the imaging optics are adapted to reproduce the visual signal on a surface.

According to a further exemplary embodiment of the present invention, an aircraft is provided, comprising an area projection system for reproducing a visual signal on a surface.

According to a further exemplary embodiment of the present invention, an area projection system for reproducing a visual signal on a surface is used in an aircraft.

In the context of further explanations, the following terms are used.

Light Guide Element:

In the context of further explanations, the term light guide element may refer to any element that is suitable to guide or propagate electromagnetic radiation. In this context the electromagnetic radiation may preferably comprise a wavelength ranging from 380 nm to 780 nm, thus corresponding to the light spectrum that is visible to the human eye. Preferably, optical waveguides, glass fibres, polymeric optical fibres, light-guiding components made of plastic, or fibre-optic components may be used as light guide elements.

Fibre Element:

In the context of further explanations, the term fibre element may refer to any accumulation of light guide elements. The light guide elements of the fibre element may be connected to form a compact unit; however, they may also be mutually arranged only in the near region, for example without being mutually interlinked in a mechanical manner. Furthermore, exclusive mechanical linkage on the two ends of the fibre element may be imaginable.

Carrier Element:

In the context of further explanations the term carrier element may refer to any element that is suitable to at least in part accommodate or hold a component, in particular an end of the fibre element or at least one light guide element. In this arrangement, holding may take place in a positive-locking or non-positive locking manner. Receiving or holding may take place by matched geometry into/onto which geometry one of the components, e.g. a fibre element or a light guide element, is placed. In this arrangement the carrier element may substantially enclose the component in order to so make it possible for the component to reach through the carrier element, or to provide an opening for this. In this arrangement the carrier element may preferably be circular, elliptic, rectangular, square, or it may be any geometrically regular polygon. In particular, the carrier element may comprise a surface that is smaller than 315 $cm^2$, preferably smaller than 200 $cm^2$, further preferred smaller than 80 $cm^2$, still further preferred smaller than 50 $cm^2$, still further preferred smaller than 30 $cm^2$, still further preferred smaller than 12 $cm^2$, still further preferred smaller than 3 $cm^2$.

Imaging Optics:

In the context of further explanations the term imaging optics may refer to any device that is suitable to influence in a targeted manner electromagnetic radiation in general, and visible light in particular. In particular, the imaging optics may be adapted to project or focus light that emits from the second end of the fibre element, onto a surface, for example a projection area within an aircraft. In this arrangement the imaging optics may, for example, be an optical system, for example an optical lens or a plurality of optical lenses or a lens arrangement with adjustable focus.

Concretely, according to an exemplary embodiment of the present invention, a device for reproducing a visual signal on a surface, for example on a surface of an aircraft interior, e.g. the ceiling of an aircraft cabin, may be created. In this arrangement the visual signal may, for example, be a pattern, an image, an area, monochrome, polychrome or comprising greyscales, simulation of a starry sky, with actually existing or artificially imagined images of stars.

Furthermore, the visual signal may, for example, be projected onto the surface of part of the aircraft interior, for example the cabin ceiling. In this arrangement, projection may be (directly) from below in the form of conventional projection, or it may be projected at the back, i.e. from the rear, onto the surface, which in this case may be at least partly transparent. The at least partly transparent surface, for example the cabin ceiling, may thus be illuminated or transilluminated by an area projection system according to the invention.

Likewise, the area projection system may be arranged in the region of the hatracks, the overhead bins, in other words the stowage area for cabin baggage in an aircraft. In this arrangement a correction may take place in order to, despite a possibly shallow angle of incidence, achieve optically preferred projection of the visual signal.

The area projection system uses a light source, preferably a high-power light source with the lowest possible thermal losses and/or reduced power consumption, for example a high-power LED, in order to effectively prevent unnecessary heat build-up in the aircraft interior.

A fibre element is arranged downstream of the light source. The fibre element itself comprises a plurality of light guide elements that pick up the light of the light source and forward it in a defined manner.

The second end of the fibre element, which points away from the light source, is attached to a carrier element. In particular, the individual light guide elements may be arranged on the carrier element individually or in groups, in each case so as to be spaced apart, and they may penetrate said carrier element. Thus, a pattern of bright luminous spots, namely the exit openings of the light guide elements, which pattern may at least in part be irregular, may be provided. The carrier element may preferably comprise a dark colour or black on the exit- or passage surface of the light guide elements, which surface points away from the light source, in order to, for example, reduce or minimise diffused light.

The use of light guide elements may make it possible to use a significantly greater fraction of the light emitted by the light source than is the case in conventional projection systems, and thus to achieve improved luminous efficiency.

In this arrangement a carrier of a signal to be reproduced or of information to be reproduced may no longer need to be transilluminated with part of the light having to be filtered out for imaging, which results in reduced brightness due to filter losses. Instead, it is imaginable for the desired information, e.g. an image of a starry sky, by the light guide elements to generate in a targeted manner only in those positions that are necessary for reproduction.

The light energy that at the first end is coupled into the fibre element, and thus into the individual light guide elements, may be available substantially unchanged on the totality of the light guide elements exiting at the second end from the carrier element. This is due to the fact that because of the light-guiding characteristic of the individual light guide elements the totality of the coupled-in light energy illuminates exclusively those positions, in other words openings in the carrier element, which positions are subsequently used for projection of the individual luminous spots. It may thus be possible to prevent possibly significant loss of light energy by a projection of a starry sky with the use of a filter element, for example a printed film or foil (e.g. a slide) or by employing of gobos, e.g. made of metal, steel or glass, that is translucent only at the positions of the stars. At the same time it may be possible to prevent expansion effects of the individual luminous spots on the carrier element because, as a rule, each individual light guide element comprises identical dimensions, i.e. an identical diameter, at its first end and at its second end.

By means of suitable optimised selection of the packing density of the individual light guide elements a loss of light energy may be further reduced. In this arrangement the packing density corresponds to the ratio of the cumulated (individual-) receiving entry surfaces, which are effective for light reception, of the individual light guide elements to the overall surface of the fibre element.

In this arrangement the total surface of the fibre element may be the surface of the smallest geometrically regular shape that encloses the totality of the individual light guide elements. This geometric shape may preferably comprise a circular or ellipsoid shape, but it may also, for example, be a rectangle, square, trapezium or any geometrically regular polygon.

The packing density may thus be determined for the first as well as for the second end of the fibre element. The total surface of the fibre element on the second end may enclose the totality of the exiting light guide elements or the associated openings in the carrier element. Preferably the total surface of the fibre element at the second end may also be the surface of the carrier element because the latter is substantially used in its totality for subsequent projection.

Optimisation of the packing density takes place by reducing the regions of the fibre element that do not take up light. This may, among other things, refer to the edge region or casing of the individual light guide elements, as well as to substantially free regions between the individual light guide elements, which regions due to the geometric shape of the light guide elements are not filled. These free regions or spaces may also be used in order to connect the individual light guide elements to form a compact bunch, for example by a suitable adhesive.

Furthermore, the average distance between adjacent light guide elements on the second end may be larger than at the first end. In particular, the distance between adjacent light guide elements at the first end may substantially be zero.

The light guide elements may provide very bright and sharply delimited discrete luminous spots which subsequently may be easily reproduced or projected. By suitable adaptation of the light source to the first end of the fibre element, i.e. the end facing the light source, considerably better efficiency may be achieved than is the case in a conventional projection system with, for example, a transilluminated starry-sky motive in the form of a foil or film. This may be due to the fact that in a conventional projection system a flat area is lit, wherein the light is absorbed wherever no stars are to be reproduced.

In comparison to this, the area projection system according to the present invention exclusively lights the region that is directly used for implementing the luminous spots. In particular, the light source may be optimised to the first end of the fibre element, and thus to the cumulative overall surface of the light guide elements. This may result in optimised inputting, into the fibre element, of the light energy emitted by the light source.

Furthermore, it may be imaginable to arrange the light source so that it is not located in direct proximity to the carrier element with the coupled fibre element. Instead, the light source may be arranged separately at some other location in the cabin, and the fibre element with its light guide elements may be arranged to be correspondingly long. Moreover, the light source with a light guide element that is able to bridge considerable distances may be arranged separately and by using this light guide element may input light at the first end into the fibre element.

Furthermore, several area projection systems are imaginable that are matched or aligned to each other so as to ensure substantially continuous reproduction of a visual signal on a surface, for example continuous reproduction of a starry sky on the cabin ceiling.

As a light source, for example an LED array with 50 LEDs may be employed. The LEDs of the light source may be activated individually such that star constellations may be changed, thus it may be possible to generate dynamic star constellations.

The LEDs may comprise different shades of white, e.g. warm white, neutral white and cold white. Warm white may comprise a colour temperature range of 2.500 K to 3.500 K, in particular 3.000 K, neutral white may comprise a colour temperature range of 3.500 K to 4.500 K, in particular 4.000 K, and cold white may comprise a colour temperature range from 4.500 K to 10.000 K, in particular 5.400 K.

In this regard, a mixture of as much different colour temperatures as possible may be employed for the generation of a realistic starry sky.

A separation box may comprise different mounting holes or receiving bores for accommodating individual fibre diameters.

For the generation of a realistic star constellation, a combination of different factors or parameters like for example different illumination intensities, light colours, sizes and status like blinking or constant may be required.

Further exemplary embodiments of the present invention are provided in the dependent claims.

Below, embodiments of the area projection system for reproducing a visual signal on a surface according to the present invention are described. However, these embodiments apply, also to the aircraft comprising an area projection system for reproducing a visual signal on a surface, and to the use of an area projection system for reproducing a visual signal on a surface in an aircraft.

According to a further exemplary embodiment of the present invention, at least one of the elements comprising the carrier element and the imaging optics may be arranged to correct the reproduced signal in a defined manner.

In this context the term "correct" may refer to linear or non-linear change, for example rectification, of the distortion of the image.

It may thus be necessary in cases where the surface normal of a surface used for imaging is not arranged so as to be parallel to the projection axis of the area projection system to correct or rectify distortion of imaging on the surface. For example, trapezioid rectification may be necessary if the projection plane and the surface are not arranged so as to be parallel. In this arrangement it may be the case that not every imaginable point of the projected visual signal has the same distance to the light source, to the fibre element, the carrier element or the imaging optics, so that this may result in non-uniform projection. By means of suitably arranged pre-distortion, for example of the carrier element, the resulting projected visual signal may substantially be reproduced correctly on a surface. Furthermore, correction of the imaged signal may take place by way of the imaging optics or by a suitable arrangement of the openings/light guide elements on the carrier element.

Correction may also take place by means of a suitable arrangement of the openings, and thus of the light guide elements, on the carrier element.

According to a further preferred embodiment of the present invention, the light source may be arranged as a high-power LED.

A high-power LED may be understood to be a LED (light emitting diode) with a particularly high output and thus particularly high light intensity or light energy. Outputs of high-power LEDs may range from one to three watts. However, embodiments with ten watts, 15 watts or more may also be imaginable. Known manufacturers of high-power LEDs include the companies Osram, Kingbright, Ledtech, Aculed, Nichia and Philips. High-power LEDs make it possible to provide a compact, extremely light-intense and energy-saving light source that is furthermore characterised by a long service life and low heat losses.

Also conceivable is the use of regular LEDs and standard power LED's, which may be adequate for the generation of a realistic nightly sky in a shaded passenger cabin.

According to a further preferred embodiment of the present invention, the area projection system furthermore may comprise an actuator, wherein the actuator is arranged to influence the imaging optics in a defined manner so that reproducing the visual signal may be influenced.

By means of the above it may be possible, for example, to influence the focus of the area projection system in a targeted manner and thus to adaptively sharpen on a surface the visual signal to be reproduced. In this arrangement the actuator may be adapted to be manual, electrical or pneumatic, and to directly or indirectly influence the imaging optics or parts thereof.

Furthermore, by way of the actuator the distance between a lens and the carrier element and/or surface, or in a lens system or lens arrangement, individual distances between or among the lenses may be set.

The actuator may be directly coupled to individual lenses or further elements, or it may, by way of a rod assembly or lever construction, set the position at least of individual lenses relative to the carrier element, the surface and/or further lenses of a lens system or lens arrangement.

Thus, for example, sharp, i.e. clearly defined, reproduction of a visual signal on a surface may be achievable simply and conveniently.

Furthermore, rendering the reproduced signal sharp may be superimposed by desired, defined or random movement of the visual signal. In this way a "walking", moving visual signal may be generated.

According to a further exemplary embodiment of the present invention, the area projection system furthermore may comprise an image generating element comprising a plurality of image elements, wherein each light guide element may be associated with precisely one image element.

The image generating element may be a known image generating element, for example of the type that may be used in conventional LCD projectors, DLP projectors or comparable projectors, or it may, for example, be a transilluminated TFT element. Each image element or pixel of the image generating element may be exclusively connected with precisely one light guide element. It may thus be possible to associate each light guide element with a defined, desired brightness and/or colour. Furthermore, in a simple manner dynamically changing signals may be able to be fed into the light guide elements and may subsequently be reproduced. Luminous spots or individual stars may in this way be individually controlled.

According to a further exemplary embodiment of the present invention, the area projection system may furthermore comprise a plurality of at least one of the elements of the group comprising a light source, image generating element, collimation element, focusing element, combined collimation- and focusing element, reflection element, optically active element, imaging optics, lens, lens system, lens arrangement, optics, aperture disc and ellipsoid reflector. Moreover, the area projection system may comprise at least one of the elements stated.

By means of the above, parts of the area projection system may be arranged manifold, in particular in parallel. For example, two light sources may be provided which, for example, comprise different brightness or colour in order to in this manner influence the visual signal in a targeted way. Furthermore, it may be imaginable, by means of two imaging optics, to reproduce or project at least part of the visual signal onto different surfaces independently of each other.

According to a further exemplary embodiment of the present invention, a subset of the light guide elements may be adapted to be connectable exclusively with one of the plurality of light sources and/or image elements.

Thus in each case the individual subsets may be able to be discretely controlled or adjusted separately with the use of a light source or an image element. A blinking subset may e.g. simulate sparkling stars, which alter their brightness.

According to a further exemplary embodiment of the present invention, the area projection system may furthermore comprise a separation element that is arranged between the plurality of light sources and/or image elements and the fibre element.

A separation element may make it possible in a simple way to minimise or stop the influence of the several light sources and/or image elements among themselves when the visual signal enters the fibre element. The separation element may thus seal off the plurality of light sources and/or image elements from each other, or it may mask them from each other. A separation element may also be understood to be a collimation element. Thus a sharp demarcation of light sources and/or image elements from each other and from the light guide elements of the fibre element may take place.

According to a further exemplary embodiment of the present invention, a subset of the light guide elements may comprise different dimensions when compared to a further subset of the light guide elements, for imaging stars of different size (e.g. small/large or dark/bright stars)

In this arrangement the light guide elements may not have the same cross section or diameter. In this way different exit apertures and thus luminous spots of different sizes may be achievable on the surface of the carrier element. The visual signal subsequently reproduced may not exclusively comprise luminous spots of almost identical size, but instead may comprise luminous spots whose size and/or brightness differ.

According to a further exemplary embodiment of the present invention, the packing density of the light guide elements at the first end may be higher than the packing density of the light guide elements at the second end.

Thus, fanning out of the individual light guide elements and thus of the individual luminous spots on the surface of the carrier element may be achievable. The light energy of the cumulated luminous spots on the carrier element at the second end may substantially correspond to the light energy that is input at the first end into the fibre element. Furthermore, as a result of this, at any desired magnification, widening of the individual luminous spots or weakening of the brightness of the individual luminous spots from the first end to the second end may be prevented.

In this context magnification may on the one hand be described by the ratio of the total surface of the fibre element at the second end to the total surface of the fibre element at the first end, and on the other hand also by the ratio of packing density at the first end to the packing density at the second end. Furthermore, a larger area at the input end over a smaller area at the output end may allow for amplification of light intensity.

BRIEF DESCRIPTION OF THE DRAWINGS

Below, exemplary embodiments of the present invention are shown in the figures and are furthermore explained in more detail. Identical or similar components in different figures have the same reference numerals. The illustrations in the figures are schematic and not to drawn to scale, but they may depict qualitative proportions.

Implementation of the invention is not limited to the embodiments shown in the figures. Instead, a multitude of variants are imaginable that make use of the solution shown and of the principle according to the present invention, even if the embodiment is basically of another type.

Figure 1B:
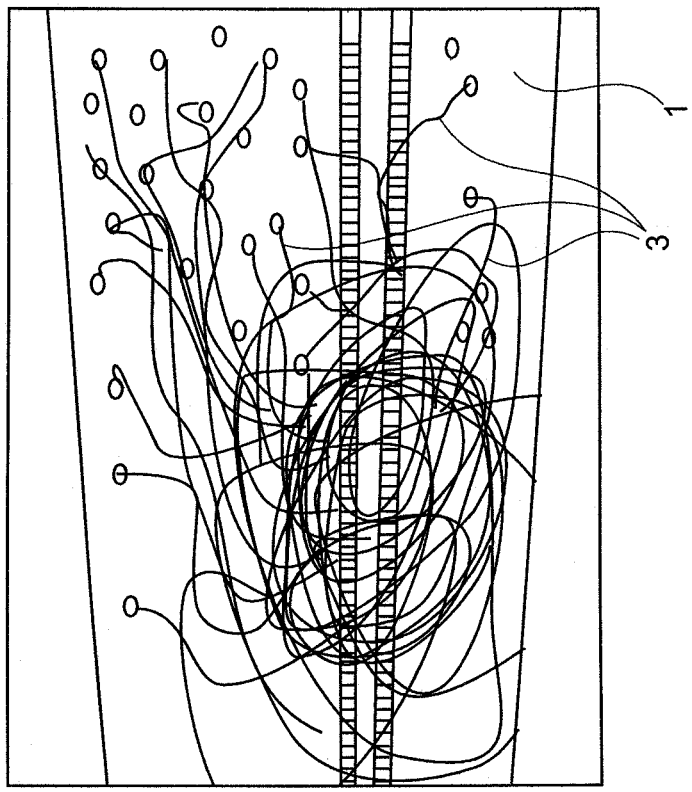
Figure 1A:
Figure 2B:
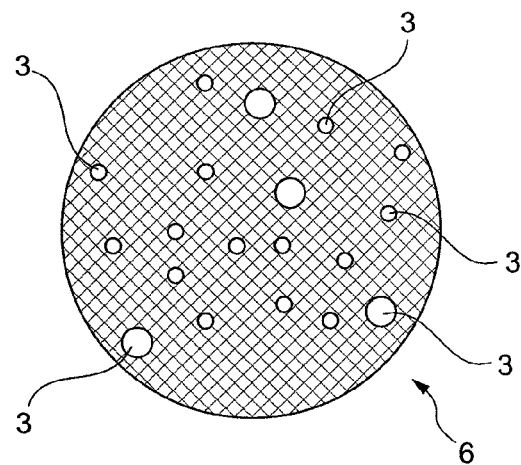
Figure 2A:
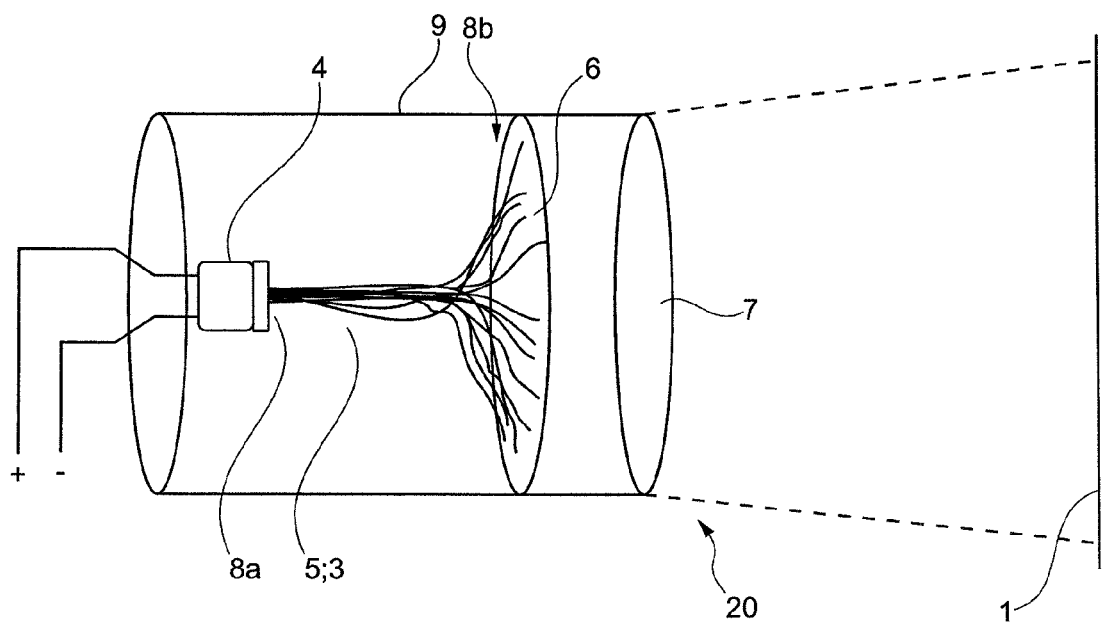
Figure 3B:
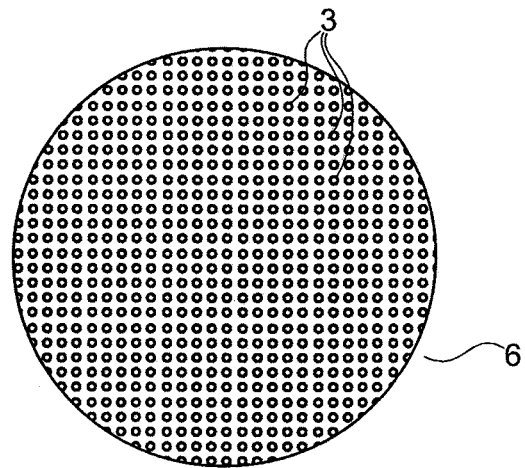
Figure 3A:
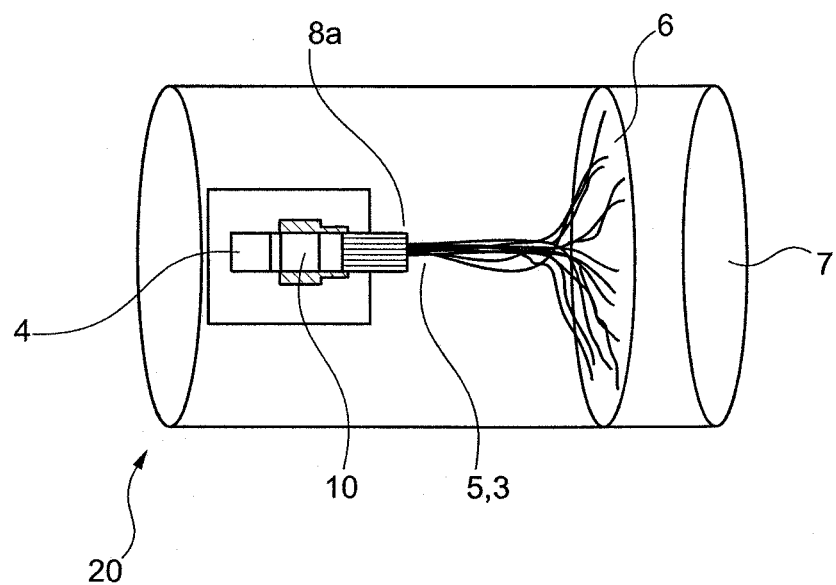
Figure 5:
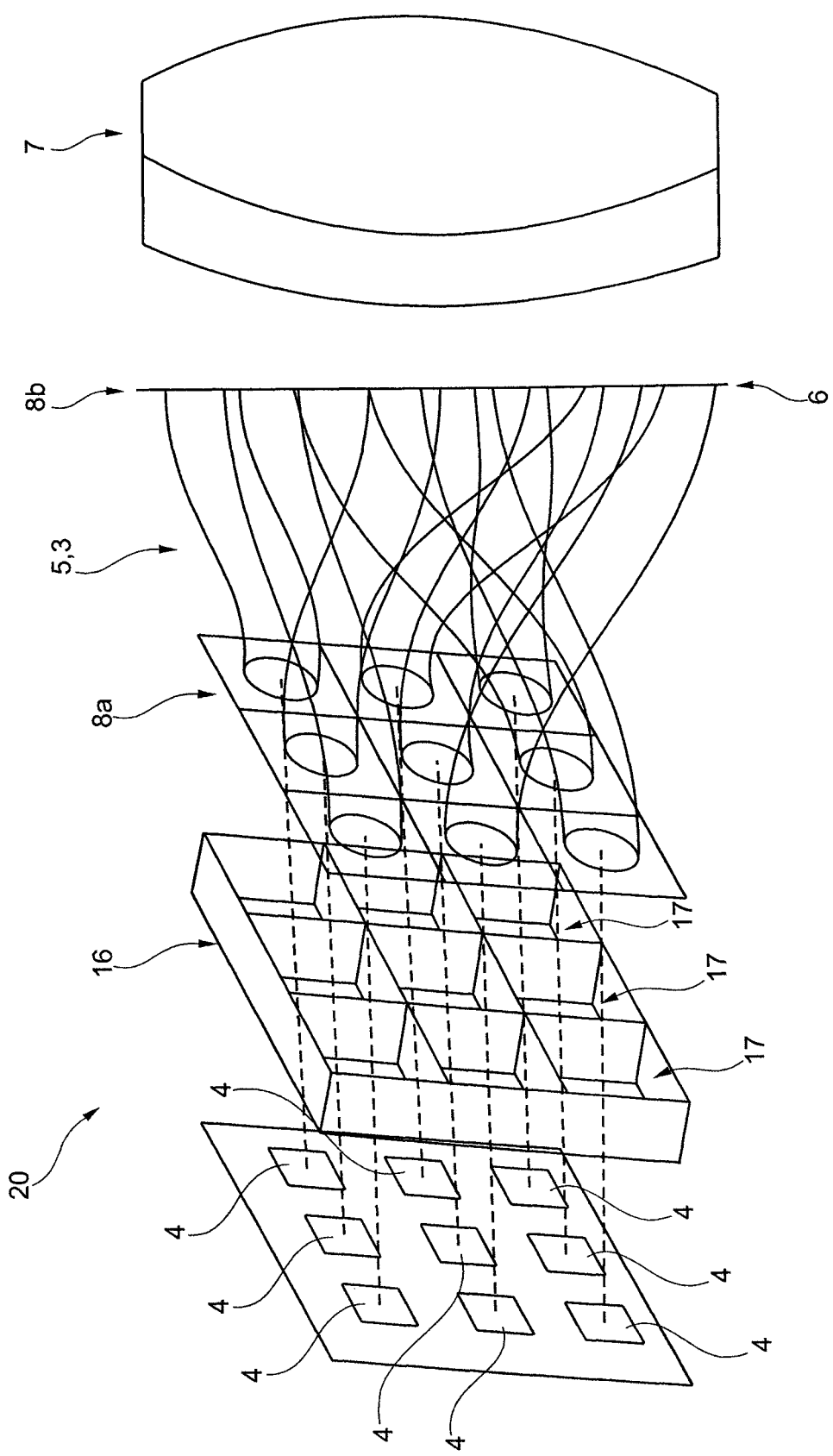
Figure 6:
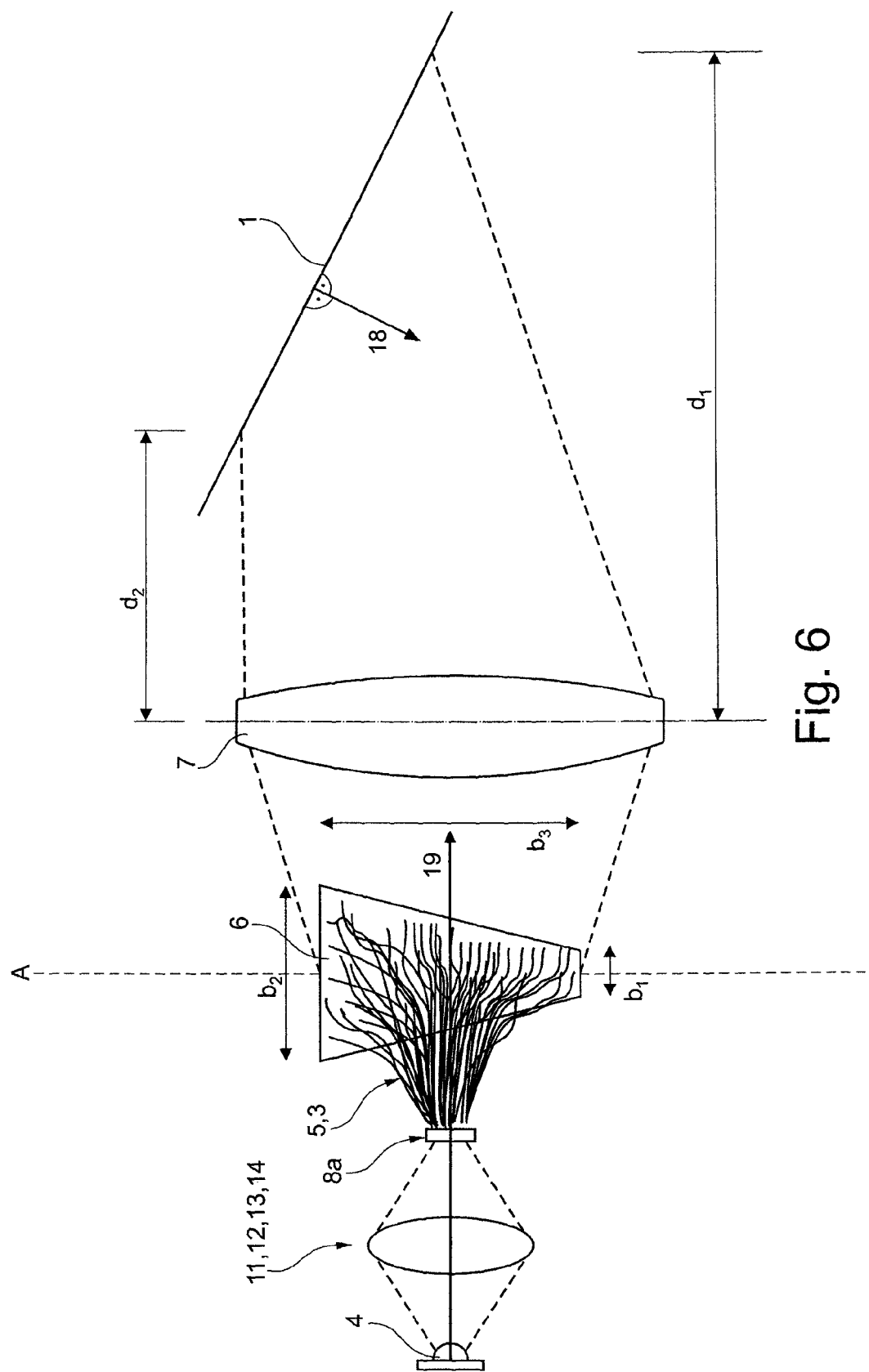
Figure 7:
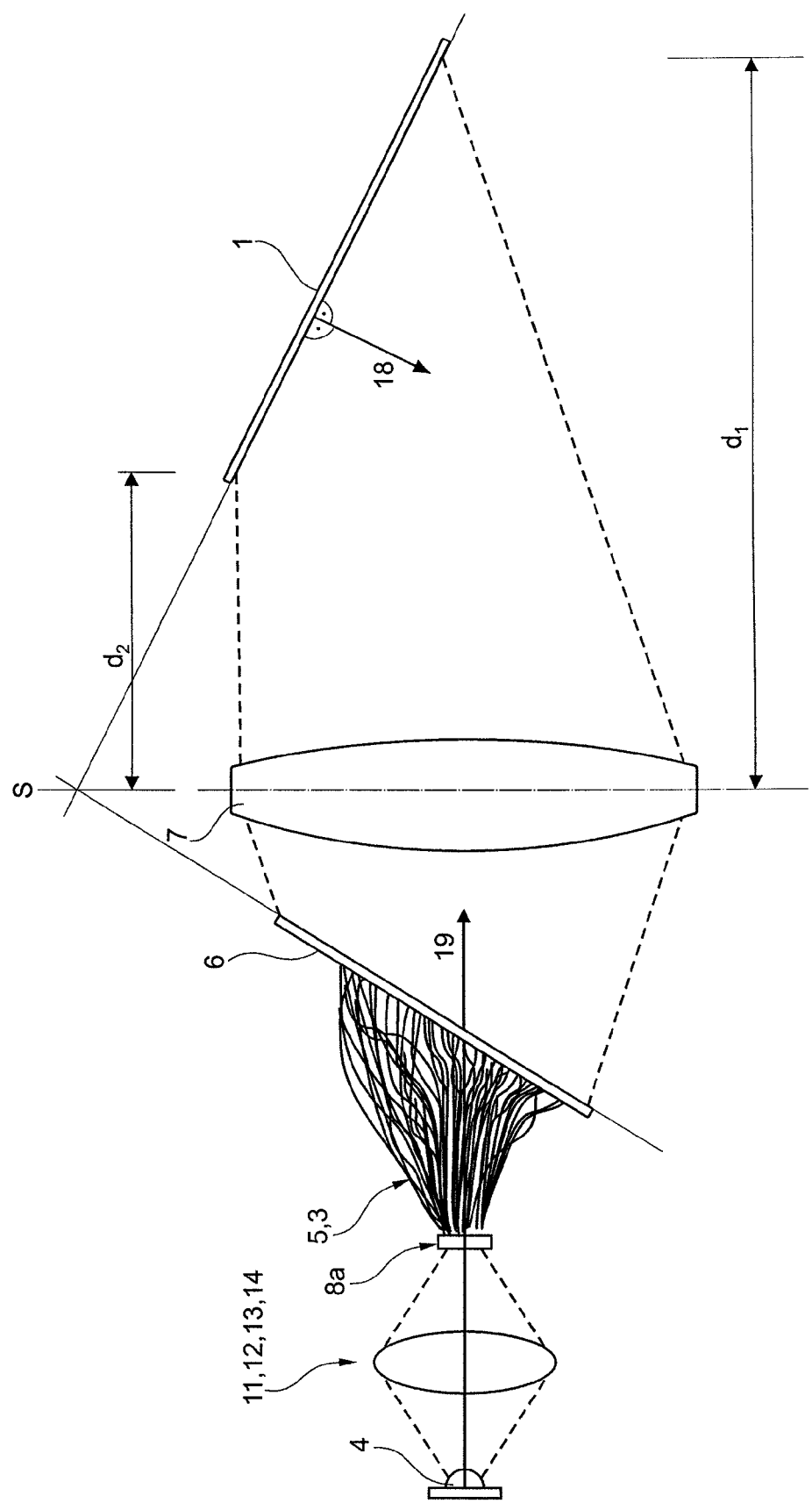

It shows:

FIG. 1a, b an exemplary embodiment of a starry sky in an aircraft;

FIG. 2a, b an exemplary embodiment of an area projection system for reproducing a visual signal on a surface, according to the present invention;

FIGS. 3a, b further exemplary embodiments of an area projection system for reproducing a visual signal on a surface, according to the present invention;

FIGS. 4a-h further exemplary embodiments of an area projection system for reproducing a visual signal on a surface, according to the present invention;

FIG. 5 a further exemplary embodiment of an area projection system for reproducing a visual signal on a surface, according to the present invention, with a separation element;

FIG. 6 a further exemplary embodiment of an area projection system for reproducing a visual signal on a surface, according to the present invention, with correction of reproduction by the carrier element, FIG. 7 a further exemplary embodiment of an area projection system for reproducing a visual signal on a surface according to present invention taking into account the Scheimplug principle, FIG. 8 an exemplary embodiment of a light source arrangement according to the present invention, FIG. 9a,b an exemplary embodiment of a separation element according to the present invention.

DETAILED DESCRIPTION OF THE EMBODIMENTS

Below, with reference to FIGS. 1a and b, an exemplary embodiment of a starry sky in an aircraft is described.

FIG. 1a in exemplary fashion shows a surface 1 in an aircraft, of an aircraft interior, in particular of the ceiling of an aircraft cabin. A visual signal 2 comprising a plurality of luminous spots is applied to, or integrated in, the surface 1. The visual signal 2, the plurality of luminous spots, simulates a starry sky on the ceiling of the aircraft cabin.

FIG. 1b shows an interior view or rear view of the surface 1 of the aircraft cabin of FIG. 1a. Underneath the surface 1, the cabin ceiling, of the side facing away from the passenger compartment, a plurality of light guide elements 3 are arranged, of which only three are designated in exemplary fashion in FIG. 1b. At several positions the light guide elements 3 project through the material of the cabin ceiling, which material in the present embodiment is a plastic material, into the passenger cabin.

Furthermore, with reference to FIGS. 2a and b, an exemplary embodiment of an area projection system for reproducing a visual signal on a surface, according to the present invention, is described.

FIG. 2a shows an area projection system 20 comprising a light source 4, which is connected to an energy source (not designated in detail) by way of the two connections "+" and "−". Downstream of the light source 4 a fibre element 5 is connected that comprises a plurality of light guide elements 3. The fibre element 5 comprises a first end 8a that is arranged on/at the light source 4. At a second end 8b the fibre element 5 or the light guide elements 3 are connected to the carrier element 6. In this arrangement the carrier element 6 comprises openings on which the individual light guide elements 3 are arranged, or through which openings the individual light guide elements 3 project at least in part through the carrier element.

Furthermore, there are imaging optics 7, only diagrammatically shown in FIG. 2a. The area projection system 20 may be arranged in a housing 9. The light source 4 may be coupled to the fibre element 5 that comprises light guide elements 3. The light guide elements 3 may end in a disc, a carrier element 6 comprising holes. The carrier element 6 is black or dark in the direction of the imaging optics 7.

The arrangement of the holes in the carrier element 6, and thus the arrangement of the end points of the light guide elements 3 at the second end, may preferably correspond to a desired, actually existing star constellation. By coupling the light into the light guide elements 3, extremely bright points may arise at the holes of the carrier element 6. The size of the holes may correspond to the size of the incorporated light guide elements 3 and thus also to a relative size of stars in a desired star constellation. The imaging optics 7 reproduce the carrier element 6 and thus the star constellation on a surface 1. Since the light guide elements 3 may be extremely thin, a sharp image of a star constellation may appear on the projection surface.

FIG. 2b shows the carrier element 6 with different openings for the light guide elements 3. The openings differ in size or in diameter. Light guide elements 3 of different size, or of different diameter or identical size may be connected to the aforesaid, wherein only subsequently do the openings in the carrier element 6 comprise different dimensions.

The surface of the carrier element 6 is preferably dark or black, as shown in FIG. 2b. The resulting pattern of bright points on the carrier element 6 is subsequently reproduced by the imaging optics 7 on a surface 1. In this process the imaging optics 7 may carry out optical magnification of the image of the carrier element 6 with the individual light guide elements 3. Corresponding magnification may, for example, be factor 5, factor 10, factor 15, factor 20, factor 25, factor 30, factor 40 or factor 50. Finally, only the lit ends of the light guide elements 3 or the bright points on the carrier element 6 may be visible as projected luminous spots on the surface 1.

Furthermore, with reference to FIGS. 3a and b, a further exemplary embodiment of an area projection system 20 for reproducing a visual signal on a surface according to the present invention is described.

The area projection system 20 again comprises a light source 4, a fibre element 5 comprising light guide elements 3 that are arranged on a carrier element 6. Imaging optics 7 make possible subsequent projection onto a surface 1.

In contrast to the area projection system 20 of FIG. 2, an image generating element 10 is in place, arranged between the light source 4 and the fibre element 5 at the first end 8a of the fibre element 5. As is shown in FIG. 3a, the image generating element 10 is transilluminated by the light source 4. The image generating element 10 comprises individual image elements (not shown in detail). Each image element of the image generating element 10 (each pixel) is exclusively associated with a light guide element 3 of the fibre element 5.

The light source 4 may be arranged as a monochrome high-power LED, or it may be an RGB-LED, in other words a LED which in turn provides elements for all three primary colours red, green and blue in order to generate any desired secondary colour in this way. The image generating element 10 may furthermore or in addition be adjustable as far as the colour and/or brightness of each image element is concerned. As shown in FIG. 2b, the individual light guide elements 3 may also be connected to the carrier element 6, and may comprise different diameters of the light guide element 3 and/or the opening in the carrier element 6.

Furthermore, an opening arrangement with light guide elements 3 as shown in FIG. 3b may be implemented. In FIG. 3b the individual light guide elements 3 are arranged in a regular pattern on the surface of the carrier element 6. Due to the direct coupling with the image elements of the image generating element 10, each light guide element 3 that shines through the carrier element 6 may now be individually controlled, and its colour and/or brightness may be set in a defined manner. By means of individual targeted controlling of the individual pixels or light guide elements 3, a visual effect/impression that is comparable to that of FIG. 2a may be achieved. By means of dynamic control of the individual image elements, in this way even, for example, a "moving", dynamically changing starry sky may be reproduced.

The image generating element 10 may be controlled with video images. These may be reproduced on a surface 1 by way of the carrier element 6 with apertures through the imaging optics 7. In this case the carrier element 6 may comprise an arrangement of apertures or light guide exit apertures, which arrangement corresponds to a star constellation. They may comprise equidistant spacing or some other regular geometric arrangement. The brightness and colour of an opening in the carrier element 6, e.g. a star to be reproduced, may depend on the image content supplied by the image generating element 10. An arrangement arranged in this way may not be able to reproduce known video films, but it may be suitable for reproducing extremely sharp highly-focussed pixels or images of stars.

Furthermore, with reference to FIGS. 4a to h, further exemplary embodiments of an area projection system for reproducing a visual signal on a surface, according to the present invention, are described.

Figure 4A:
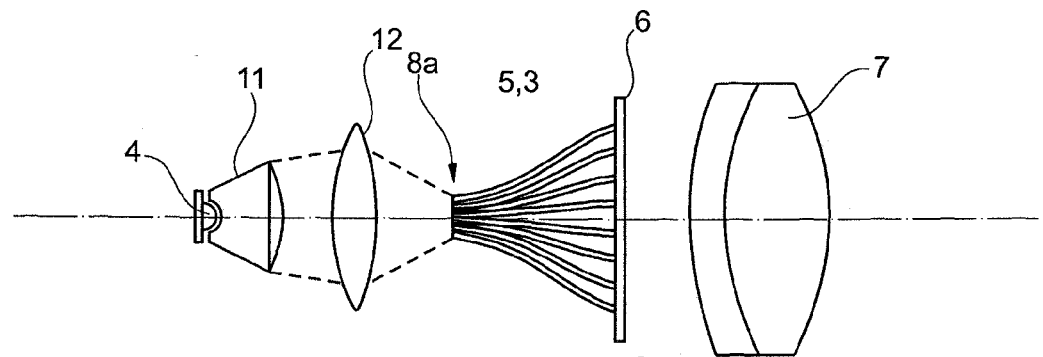

FIG. 4a shows a previously described area projection system 20 for reproducing a visual signal on a surface, according to the present invention. Furthermore, FIG. 4a shows a collimation element 11 and a focusing element 12. The collimation element 11 substantially fully receives the light that is emitted by the LED, and in this process shades edge regions. Diffused light may thus be effectively suppressed and, furthermore, any reflections occurring as a result of this are avoided. The collimated light is subsequently focussed, by the focusing element 12 which in the diagram is shown as a lens, in such a way onto the first end 8a of the fibre element 5 that the latter may be maximally lit and is thus able to input a maximum of light energy into the fibre element 5 and thus into the individual light guide elements 3.

Figure 4B:
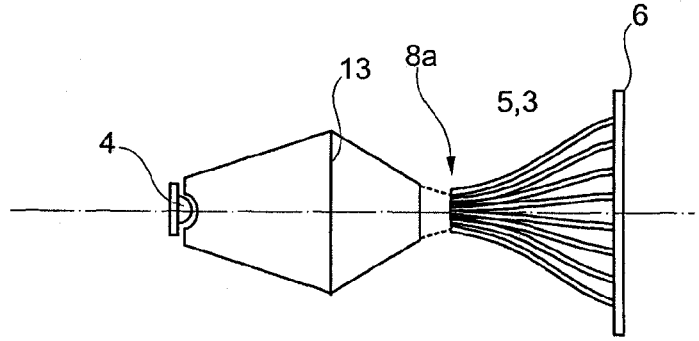

Furthermore, with reference to FIG. 4b, a combined collimation- and focusing element 13 is shown, which may assume the functionality of the individual elements of collimation element 11 and focusing element 12 as previously described in the context of FIG. 4a. With a design in a shared housing, simple and robust construction may be possible.

Figure 4C:
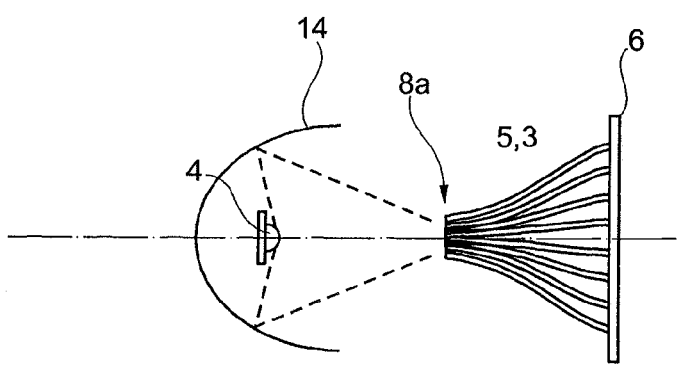

FIG. 4c shows among other things an ellipsoid reflector 14. The ellipsoid reflector 14 comprises two focal points. In the first focal point the light source 4 is arranged; in the second focal point the first end 8a of the carrier element 6 and thus of the light guide elements 3 is arranged. By small mechanical shifting of the light source 4 in the focal point of the ellipsoid reflector 14 adjustment or dynamic lighting of the fibre element 5 at its first end 8a may be possible.

Figure 4D:
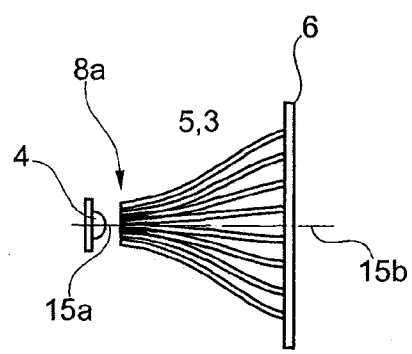

FIG. 4d shows the direct input, into the fibre element 5, of the light emitted by the light source 4 at the first end 8a.

By means of a relatively wide angle of radiation of the light source 4, for example in the region of 90 to 150 degrees, it may be possible that there is no need to have to set the optical axis 15a of the light source 4 and the optical axis 15b of the fibre element 5 so that they are substantially parallel as shown in FIG. 4d. Due to the large angle of radiation of the light source 4 it may be possible for the two optical axes 15a, b to diverge from each other, for example in the range of 30 degrees, 45 degrees, 60 degrees or 90 degrees. Direct input coupling may make possible a significantly more compact design and may result in a lighter system with less weight. Fewer elements are required, and thus costs may be reduced.

Figure 4E:
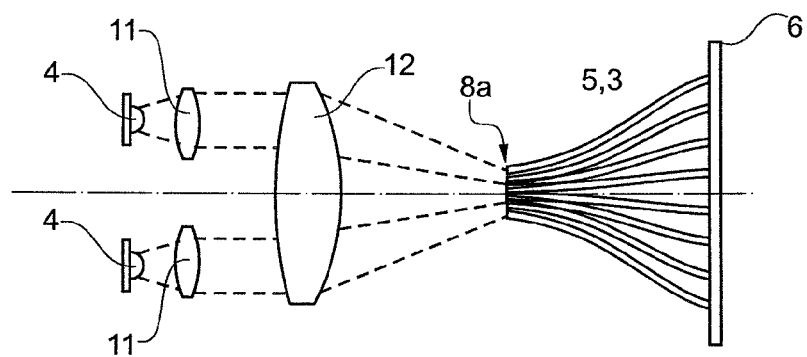

FIG. 4e in exemplary fashion shows two light sources 4 as well as two collimation elements 11 that together act on a focusing element 12. Both light sources 4 together with the collimation element 11 may substantially fully act on the focusing element 12 or only on a partial region of the focusing element 12. Furthermore, the light of each individual light source 4, which light downstream of the focus element 12 impinges on the first end 8a, may completely illuminate the first end of the fibre element 5 or only a partial region. In this way, consequently, intelligent control of the luminous spots on the carrier element 6 may be possible. The light sources 4 may comprise different intensities and/or different colouring. Furthermore, a light source 4 may be arranged so as to be blinking, while another one may be arranged so as to be permanently lit. Furthermore, the focusing element 12 may also be arranged in multiple parts, wherein each partial focusing element 12 may be exclusively allocated to one light source 4 and its associated collimation element 11.

Figure 4F:
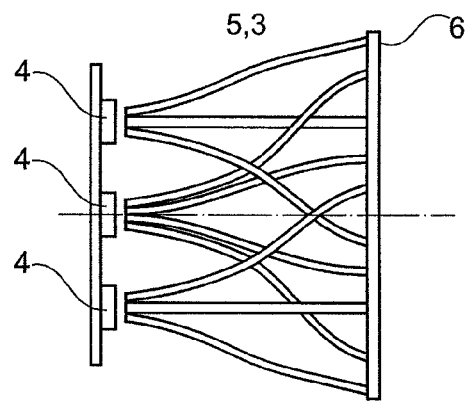

FIG. 4f shows a plurality of light sources 4, in the embodiment shown, for example, three light sources 4. The fibre element 5 with its light guide elements 3 is divided into three groups each of which is exclusively allocated to a light source 4 and is arranged at the latter. The light sources 4 are directly arranged on the respective groups of the fibre element 5 and input the emitted light in a direct manner. Any other arrangements comprising collimation element(s) 11, focusing element(s) 12, combined collimation- and focusing element(s) 13, ellipsoid reflector(s) 14 according to embodiments described above and below are imaginable.

Figure 4G:
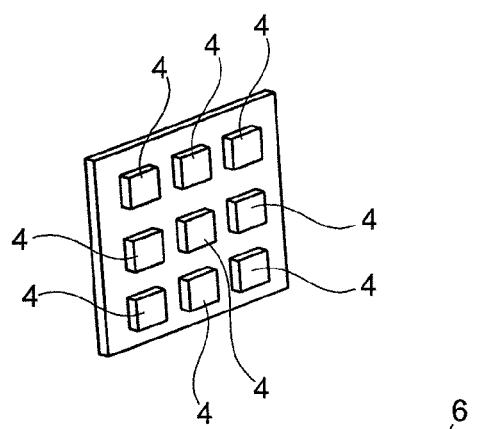

FIG. 4g shows a two-dimensional arrangement of several light sources 4. If several groups are used as shown in FIGS. 4e and f, a corresponding two-dimensional arrangement makes it possible to achieve a compact design. Any arrangements are imaginable, such as 2 times 2, 2 times 3, 3 times 3, 3 times 4, 3 times 5, 4 times 5, etc.

Figure 4H:
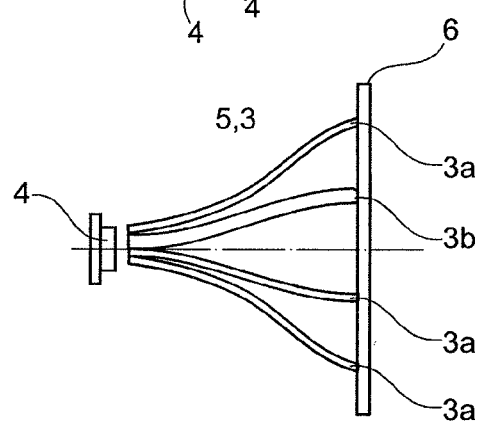

FIG. 4h in exemplary fashion shows a light source 4 with a directly coupled fibre element 5. In this arrangement the fibre element 5 comprises light guide elements 3 of different thicknesses or different diameters 3a, b. Thus, as has also been shown above in the FIG. 2a, stars or luminous spots of various sizes and/or various intensities or brightness may be able to be implemented. The individual light guide elements 3 may comprise different optical characteristics, so that, for example, the individual brightness of individual luminous spots or stars may be set and/or changed.

Furthermore, with reference to FIG. 5, a further exemplary embodiment of an area projection system 20 for reproducing a visual signal on a surface, according to the present invention, with a separation element is described.

In exemplary fashion, in FIG. 5 a light source 4, a LED array according to FIG. 4g is used. In this arrangement the light source array or LED array comprises 3 times 3, i.e. a total of 9 light sources 4. Arranged downstream of the light sources 4 is a separation element 16 that comprises individual chambers 17 which substantially correspond to the individual light sources 4 of the light source array and shield these from each other or convey the light emitted by the light sources 4 in each case exclusively to a light guide element 3 of the fibre element 5. In this arrangement the light guide elements 3 at the first end 8a of the fibre element 5 are in exemplary fashion also arranged in the form of a square array.

It is also imaginable to provide an arrangement with higher packing density. By means of the separation element 16, in each case the light of a light source 4 is exclusively conveyed to one light guide element of the fibre element 5. The individual light sources 4 are shielded by all the other chambers 17 that are not connected directly with the respective light guide element 3 by way of the chambers 17 of the separation element 16, in order to in this way make possible substantially completely independent operation. Thus the separation element 13 may, in particular, be used to ensure that in each case exclusively light of a light source 4 is input into the corresponding light guide element 3.

The separation element 16 may also be considered to be a collimation element 11 or a plurality of collimation elements 11. The (interior) geometry of each individual chamber 17 of the separation element 16 may change continuously, gradually or discontinously from a light source 4 to the associated light guide element 3 in order to in this way provide optimised collimation. Furthermore, it may be imaginable to provide individual collimation elements 11, focusing elements 12, combined collimation- and focusing elements 13, reflection elements, in particular ellipsoid reflectors 14 or colour filters or diffusers, for example frosted glass elements, in at least some chambers 17 of the separation element 16. Any exemplary embodiment discussed above may be used as a downstream fibre element 5 and as imaging optics 7.

It is also possible to associate a plurality of light guide elements 3 of the fibre element 5 with a chamber 17 of the separation element 16. For example a 3 times 3 array comprising light sources 4 or high-power LEDs is used as a light source 4. Downstream, each of the light sources 4, closed off from each other by the chambers 17 of the separation element 16, is, for example, associated with 7, 9 or 11 light guide elements 2 of the fibre element 5. Thus, in the present example 63 or 81 or 99 luminous spots may be divided into a total of 9 groups, which groups in each case can be controlled separately from other groups as far as their brightness, intensity and/or colour are concerned.

Furthermore, with reference to FIG. 6, a further exemplary embodiment of an area projection system for reproducing a visual signal on a surface, according to the present invention, is described with correction of the reproduction by a carrier element.

The carrier element 6 depicted in FIG. 6 is displayed skewed to its plane of location perpendicular to its plane of projection for further explanation and improved depictation. In the normal mode of operation, the trapezoid element would be arranged skewed with regard to its axis A, such that it would be arranged perpendicular to the plane of projection and consequently only a line with length $b_3$ would be displayed on axis A.

FIG. 6 describes an embodiment of the present invention with a light source 4. Collimation elements or focusing elements 11, 12, 13 are arranged between the light source 4 and the fibre element 5 with light guide elements 3. In FIG. 6 the carrier element 6 comprises a specially adapted geometry which in this arrangement in particular is adapted to the geometry of the surface 1 in order to, viewed together with the geometry of the surface 1, provide reproduction whose distortions have been completely rectified. In this arrangement the surface normal 18 of the surface 1 is not parallel to the projection axis 19 of the area projection system 20.

For example, according to FIG. 6 in exemplary fashion, for predistortion of the image to be displayed, a trapezium element is used as a carrier element 6. In this arrangement side b1 may be shorter than side b2 because in each case the projection distance, i.e. the distance after which the projected signal impinges on the surface, in distance d2, associated with b2, is shorter than in distance d1, associated with b1. The imaging optics 7 in turn are alternatively or in addition arranged to ensure sharp, focussed reproduction of the visual signal 2 over the entire surface 1. For other types of surfaces 1 the carrier element 6 and/or the imaging optics 7 may, furthermore, be specially adapted.

A further example of predistortion may be an elliptically shaped opening of at least one fibre element 5 at the carrier element 6, which may again be projected substantially circular after projection on an inclined surface.

Now referring to FIG. 7, further exemplary embodiments of an area projection system for reproducing a visual signal on a surface according to the present invention taking into account the Scheimpflug principle is depicted.

As depicted in FIG. 7, related to an inclined projection, an embodiment taking into account the Scheimpflug principle may be preferred. According to the Scheimpflug principle, for a preferred projection and in particular a sharp, in-focus projection, the object plane, the lens plane (or objective plane) as well as the image plane may have to converge in a single point, here point S.

In this regard, the carrier element may in particular be arranged without a trapezoid predistortion, but may rather comprise a rectangular or square outline. This outline may allow, despite an inclined surface, for a substantially, again rectangular or square reproduction of the carrier element.

Particular embodiments of the surface may require a combination of the projection according to FIG. 6 and FIG. 7.

Now referring to FIG. 8, an exemplary embodiment of a light source arrangement according to the present invention is depicted.

FIG. 8 shows an arrangement of light sources 4. The light sources 4, here exemplary depicted as LEDs, in particular semi-conductor LEDs on a printed circuit board, are arranged as an array or matrix structure comprising columns and rows. As an example, in FIG. 8 50 LEDs or light sources 4 are depicted, which may in particular be activated individually or in groups by contacts at the backside of the printed circuit board, which contacts are not depicted. Activation may be understood as a change in respective illumination intensity, light colour, e.g. warm white or cold white, or the status like being constantly illuminated, blinking, off or continuously dimming or increasing in light intensity.

In particular, individual light sources 4 may comprise differing shades of white like warm white or cold white, which may be changed dynamically by the activation, including cross-fading.

Now referring to FIGS. 9a,b, an exemplary embodiment of a separation element according to the present invention is depicted.

Separation element 16, depicted in FIG. 9a, may be employed with a light source arrangement according to FIG. 8. The separation element 16 exemplary comprises 50 chambers 17, which again are arranged in five rows of ten columns each.

Altogether, three different sized chambers 17 are depicted in FIG. 9a. Thus, a chamber 17a may e.g. comprise the size or diameter of 0.5 mm, a chamber 17b may comprise a diameter of 0.75 mm and a chamber 17c may comprise a diameter of 1.00 mm.

The chambers 17 of the separation element of FIG. 9a may comprise a uniform diameter or may, as illustrated in FIG. 9b, may comprise an enlarged diameter on one side of separation element 16. The different receiving bores or opening diameters of chambers 17 of the separation element may be adapted to the external dimensions of the light guide elements 3 in a way, such that the light guide elements 3 may be arranged in the receiving bores of chamber 17 of the separation element 16 substantially free of play, thus mounted or attached to.

In addition, it should be noted that "comprising" does not exclude other elements or steps, and "a" or "an" does not exclude a plural number. Furthermore, it should be noted that characteristics or steps which have been described with reference to one of the above exemplary embodiments or exemplary designs of the present invention may also be used in combination with other elements or steps of other exemplary embodiments or exemplary designs, described above, of the present invention. Reference numerals in the claims are not to be considered or interpreted as limitations.

LIST OF REFERENCE CHARACTERS

1 Surface
2 Visual signal
3a, b Light guide element
4 Light source
5 Fibre element
6 Carrier element
7 Imaging optics
8a, b First, second end
9 Housing
10 Image generating element
11 Collimation element
12 Focusing element
13 Combined collimation element and focusing element
14 Ellipsoid reflector
15a, b Optical axis of light source, optical axis of fibre element
16 Separation element
17a,b,c Chamber of the separation element
18 Surface normal
19 Projection axis
20 Area projection system

The invention claimed is:

1. An area projection system for reproducing a visual signal on a surface, the system comprising:
   a light source;
   a fibre element comprising a plurality of light guide elements;
   a carrier element; and
   imaging optics;
   wherein a first end of the fibre element is arranged at the light source, and a second end of the fibre element is arranged at the carrier element;
   wherein the imaging optics are arranged at the second end of the fibre element;

wherein the area projection system is adapted to transmit a visual signal from the light source to the fibre element and subsequently to the imaging optics;

wherein the imaging optics are adapted to reproduce the visual signal on a surface; and wherein the carrier element is adapted to pre-distort the visual signal such that the resulting projected visual signal is reproduced substantially correctly on the surface.

2. The area projection system of claim 1, wherein the imaging optics is adapted to correct the reproduced visual signal in a defined manner.

3. The area projection system of claim 1, wherein the light source includes a high-power LED.

4. The area projection system of claim 1, further comprising:

an actuator adapted to influence the imaging optics in a defined manner such that reproducing the visual signal is influenced.

5. The area projection system of claim 1, further comprising an image generating element including a plurality of image elements, wherein each of the plurality of light guide elements is associated with precisely one image element.

6. The area projection system of claim 1, further comprising a plurality of devices selected from the group consisting of a light source, image generating element, collimation element, focusing element, combined collimation- and focusing element, reflection element, optically active element, imaging optics, lens, lens system, lens arrangement, optics, aperture disc, ellipsoid reflector, and a combination thereof.

7. The area projection system of claim 5, wherein a subset of the plurality of light guide elements is exclusively connected to at least one of a plurality of light sources or the plurality of image elements.

8. The area projection system of claim 7, further comprising:

a separation element arranged between at least one of the plurality of light sources or the plurality of image elements and the fibre element.

9. The area projection system of claim 1, wherein a first subset of the plurality of light guide elements comprises different dimensions when compared to a second subset of the plurality of light guide elements.

10. The area projection system of claim 1, wherein a packing density at the first end of the plurality of light guide elements is higher than the packing density at the second end of the plurality of light guide elements.

11. An aircraft, comprising an area projection system for reproducing a visual signal on a surface, the system comprising:

a light source;

a fibre element comprising a plurality of light guide elements;

a carrier element; and imaging optics;

wherein a first end of the fibre element is arranged at the light source, and a second end of the fibre element is arranged at the carrier element;

wherein the imaging optics are arranged at the second end of the fibre element;

wherein the area projection system is adapted to transmit a visual signal from the light source to the fibre element and subsequently to the imaging optics;

wherein the imaging optics are adapted to reproduce the visual signal on a surface; and wherein the carrier element is adapted to pre-distort the visual signal, such that the resulting projected visual signal is reproduced substantially correctly on the surface.

12. The area projection system of claim 1, wherein the visual signal is configured to simulate a starry sky and the surface is a ceiling of an aircraft cabin.

* * * * *